(12) United States Patent
Pyles (10) Patent No.: US 6,473,483 B2
(45) Date of Patent: Oct. 29, 2002

(54) PEDOMETER

(76) Inventor: Nathan Pyles, 529 College St., Lake Mills, WI (US) 53551

( * ) Notice: Subject to any disclaimer, the term of this patent is extended or adjusted under 35 U.S.C. 154(b) by 0 days.

(21) Appl. No.: 09/766,893

(22) Filed: Jan. 19, 2001

(65) Prior Publication Data

US 2001/0022828 A1 Sep. 20, 2001

Related U.S. Application Data

(63) Continuation-in-part of application No. 09/756,647, filed on Jan. 4, 2001, which is a continuation of application No. 09/181,738, filed on Oct. 28, 1998, now Pat. No. 6,175,608.

(51) Int. Cl.[7] .................................................. G01B 7/00
(52) U.S. Cl. .................................................... 377/24
(58) Field of Search ......................... 377/27; 412/2, 412/7

(56) References Cited

U.S. PATENT DOCUMENTS

| | | |
|---|---|---|
| 4,053,755 A | 10/1977 | Sherrill |
| 4,144,568 A | 3/1979 | Hiller et al. |
| 4,192,000 A | 3/1980 | Lipsey |
| 4,220,996 A | 9/1980 | Searcy |
| 4,223,211 A | 9/1980 | Allsen et al. |
| 4,334,190 A | 6/1982 | Sochaczevski |
| 4,337,529 A | 6/1982 | Morokawa |
| 4,367,752 A | 1/1983 | Jiminez |
| 4,371,945 A | 2/1983 | Karr et al. |
| 4,387,437 A | 6/1983 | Lowrey et al. |
| 4,460,823 A | 7/1984 | Ruehlmann |
| 4,466,204 A | 8/1984 | Wu |
| 4,499,394 A | 2/1985 | Koal |
| 4,510,704 A | 4/1985 | Johnson |
| 4,560,861 A | 12/1985 | Kato et al. |
| 4,566,461 A | 1/1986 | Lubell et al. |
| 4,578,769 A | 3/1986 | Frederick |
| 4,649,552 A | 3/1987 | Yukawa |
| 4,651,446 A | 3/1987 | Yukawa |
| 4,703,445 A | 10/1987 | Dassler |
| 4,741,001 A | 4/1988 | Ma |
| 4,763,287 A | 8/1988 | Gerhaeuser et al. |
| 4,771,394 A | 9/1988 | Cavanaugh |
| 4,814,661 A | 3/1989 | Ratzlaff |
| 4,821,218 A | 4/1989 | Potsch |
| 4,830,021 A | 5/1989 | Thornton |
| 4,848,009 A | 7/1989 | Rodgers |
| 4,855,942 A | 8/1989 | Bianco |
| 4,956,628 A | 9/1990 | Furlong |
| 4,962,469 A | 10/1990 | Ono et al. |
| 5,033,013 A | 7/1991 | Kato et al. |

(List continued on next page.)

FOREIGN PATENT DOCUMENTS

EP         0 119 009         9/1984

OTHER PUBLICATIONS

From PCT/IPEA/408, Written Opinion receieved Aug. 8, 2000, 5pgs.
From PCT/ISA/210, International Search Report, 4pgs.
Sportline Products, "Fitness Pedometer 360", web page, 1pg.
Sportline Products, Fitness Pedometer 360 packaging label, 5pgs.

Primary Examiner—Margaret R. Wambach
(74) Attorney, Agent, or Firm—Lathrop & Clark LLP (57) ABSTRACT

The pedometer having improved accuracy by being calibrated to actual user stride lengths and stride rates, and being recalibrated as necessary based on subsequent actual stride rates and lengths. The pedometer can also interact with a heart monitoring device.

19 Claims, 2 Drawing Sheets

U.S. PATENT DOCUMENTS

| | | |
|---|---|---|
| 5,065,414 A | 11/1991 | Endouet al. |
| 5,117,444 A | 5/1992 | Sutton et al. |
| 5,164,967 A | 11/1992 | Endo et al. |
| 5,188,447 A | 2/1993 | Chiang |
| 5,285,586 A | 2/1994 | Goldston |
| 5,335,664 A | 8/1994 | Nagashima |
| 5,361,778 A | 11/1994 | Seitz |
| 5,373,651 A | 12/1994 | Wood |
| 5,456,262 A | 10/1995 | Birnbaum |
| 5,457,900 A | 10/1995 | Roy |
| 5,475,725 A | 12/1995 | Nakamura |
| 5,476,427 A * | 12/1995 | Fujima .................. 482/3 |
| 5,485,402 A | 1/1996 | Smith et al. |
| 5,490,816 A | 2/1996 | Sakumoto |
| 5,491,474 A | 2/1996 | Suni |
| 5,500,635 A | 3/1996 | Mott |
| 5,516,334 A | 5/1996 | Easton |
| 5,526,290 A | 6/1996 | Kanzaki |
| 5,539,706 A | 7/1996 | Takenaka |
| 5,583,776 A | 12/1996 | Levi et al. |
| 5,611,621 A | 3/1997 | Chien |
| 5,640,786 A | 6/1997 | Buyayez |
| 5,689,099 A | 11/1997 | Domburg |
| 5,720,200 A | 2/1998 | Anderson |
| 5,724,265 A | 3/1998 | Hutchings |
| 5,797,201 A | 8/1998 | Huang |
| 5,891,042 A * | 4/1999 | Sham et al. ............. 600/483 |
| 5,899,963 A | 5/1999 | Hutchings |
| 5,918,502 A | 7/1999 | Bishop |
| 5,945,911 A | 8/1999 | Healy |
| 5,976,083 A | 11/1999 | Richardson et al. |
| 6,018,705 A | 1/2000 | Gaudet et al. |
| 6,135,951 A * | 10/2000 | Richardson et al. ........ 600/300 |
| 6,175,608 B1 | 1/2001 | Pyles et al. |

* cited by examiner

PEDOMETER

This application is a continuation-in-part of application Ser. No. 09/756,647, filed Jan. 4, 2001, which is a continuation of application Ser. No. 09/181,738, filed Oct. 28, 1998, now U.S. Pat. No. 6,175,608 B1, the disclosures of which are incorporated by reference herein.

FIELD AND BACKGROUND OF THE INVENTION

The present invention relates generally to pedometers and more particularly to calibrated pedometers that can be recalibrated for enhanced accuracy. The device correlates a calibrated stride length and stride rate to an actual stride length for use in calculating the distance traveled. Actual stride rates, lengths, or distances traveled are then compared to the calibrated values stored in a table and the calibrated values are adjusted accordingly to recalibrate the pedometer. Further, initial calibration stride rates and lengths can be generated from empirical gender and height data. Finally, recalibration can be performed using an algorithm when the differences between actual values and calibrated or calculated values exceeds a predetermined amount.

Pedometers are known which include devices or algorithms for determining the distance a person travels on foot. For example, U.S. Pat. No. 4,371,945 discloses an electronic pedometer that calculates distance by electronically measuring the length of each stride taken by a user. Stride length is measured by ultrasonic waves generated by an ultrasonic module strapped to one leg and an ultrasonic detector worn on the other leg. A program compensates for a variety of measurement errors and the results are displayed on a wrist-mounted display after being transmitted by VHF waves from the leg to the wrist.

U.S. Pat. No. 4,771,394 discloses a computer shoe with a heel-mounted electronic device with an inertia footstrike counter, a timer, a sound generating device, a battery, and a gate array for counting time and footstrikes to calculate distance and running time as a function of stride time. Although recognizing the important relationship of stride length and foot speed, the shoe in this patent requires data from at least 15 test runs or walks and the data must be user-entered in pairs of footstrikes and elapsed time to cover a pre-determined distance. Further, user adjustments of time must be performed to accommodate start and stop times, and the number of counted footstrikes is increased one percent to overcome inherent errors in the inertia step counter. The shoe-mounted device is subject to damage from impact, dirt, and water, and requires a stay-at-home computer with which to interface. There is no means disclosed to transmit data to a wrist-mounted display device or an "on-board" computing device that provides "real time" data to a runner.

U.S. Pat. No. 4,855,942 discloses a pedometer and calorie measuring device that includes a wrist-mounted step counter and a fixed stride length to calculate distance traveled. Wrist-mounted step counters are known to be inaccurate because they assume a step for every arm movement. Even with error correction, such a device will provide less accurate step counts than a leg or waist-mounted counter. Further, fixed stride lengths do not take into account the fact that stride length varies with rate of movement.

U.S. Pat. No. 5,117,444 discloses a pedometer and calibration method with two calibration modes. First, a user travels a predetermined "half-distance" for the device to count and store the number of strides in that distance. Next, the user travels a second distance with the step counter comparing actual steps to the steps in memory and a current trip memory are incremented by a tenth of a "whole unit" distance. There is no correlation between stride length and stride rate which requires the user to re-calibrate the device when walking as opposed to running.

U.S. Pat. No. 5,475,725 discloses a pulse meter with pedometer function to determine pace and pulse rate of a user. The meter uses pulse wave base data compared to actual pulse wave data rates.

U.S. Pat. No. 5,476,427 discloses a pace display device utilizing a base rate for traveling pre-set distances in successive trials. The device calculates step counts and rates, and compares actual step count rates to display data to a user for comparison of present running rates to previous rates.

Many pedometers require calibration by individual users so that the stride length for that user is the basis for any subsequent distance calculation. These pedometers can be recalibrated only by repeating the initial calibration ritual.

For example, some pedometers require a user to measure his or her stride length over a 10 foot section, which involves a fairly complicated procedure of measuring out this distance, counting steps (and partial steps), and doing the math to convert this distance to inches. However, if the pedometer is used for both walking and running, the user will have to recalibrate the pedometer to account for different stride lengths used in these two activities. This same procedure is necessary if the user ever wishes to recalibrate the pedometer.

Thus, there is a need for a pedometer that can be easily calibrated and recalibrated to enhance its accuracy. There is also a need for an accurate pedometer that monitors pace to measure the intensity of a workout.

Thus, there is a need for a simple, but highly accurate, pedometer that displays distance traveled, pace, speed, heart rate, and other important information on an easily read wrist-mounted or waist-mounted device.

SUMMARY OF THE INVENTION

The present invention overcomes problems and shortcomings in the prior art by providing a pedometer including a data processor programmed to: create an initial calibration table of initial stride rates and lengths to be compared to an actual stride rate for deriving a corresponding actual stride length, use a recalibration stride rate over a known distance traveled, determine a calculated distance traveled using the initial calibration table and the recalibration stride rate, compare the calculated distance traveled with the known distance traveled to determine the difference, if any, between the two, and replace an initial stride length with a revised stride length that is a function of the initial stride length and the recalibration stride length. The pedometer can further include: a strap connected to the pedometer for releasably securing the pedometer to a user; and a heart rate monitor connected to the strap.

The pedometer's data processor can be further programmed to: calculate each stride length as an average of all the stride lengths calculated during each calibration run; calculate each stride rate as a function of the average stride rate calculated during each calibration run; to calculate an initial stride rate as a function of the average stride rate from a plurality of calibration runs, and to recalibrate a stride rate as a function of the difference between the initial stride rate and the subsequent stride rate; and/or recalibrate the stride rate based on an algorithm.

The invention is also directed to pedometer data processor programmed to: create an initial calibration table of initial stride rates and lengths for comparison with an actual stride rate for deriving a corresponding actual stride length and distance traveled, calculate a recalibration stride rate length corresponding to a known stride rate over a known distance traveled, determine a calculated distance traveled using the initial calibration table and the known stride rate, compare the calculated distance traveled with the known distance traveled to determine a difference between the two, and adjust the initial calibration table to a revised stride length that is a function of the average between the initial stride length and the known stride length. The data processor can be further programmed to: replace an initial stride length with a recalibrated stride length only when the difference between the calculated distance traveled and the actual distance traveled varies by more than a predetermined amount; recalibrate the pedometer only when the difference between the calculated distance traveled and the actual distance traveled is greater that two percent; create the initial calibration table from predetermined empirical data that can be gender-specific; and/or create the initial calibration table by calculating and storing stride rates and lengths derived from average stride rates and lengths in a series of calibration runs performed by a user.

Also, the present invention is directed to a cadence pacing device including: a step counter; a clock; and a data processor in communication with the step counter and the clock, and the data processor is programmed to calculate a pace by dividing a number of steps counted by the step counter by a period of time measured by the clock, and further programmed to compare the pace to predetermined range of paces and generating a warning signal when the pace is outside of the predetermined range of paces, wherein the warning signal can be communicated to a user. The cadence pacing device can be arranged so that the step counter, clock, and data processor are mounted on a strap and the cadence pacing device further comprises: a heart rate monitor mounted on the strap.

The device can include a waist, chest, or leg-mounted stride counting device, a transmitter, and a wrist-mounted receiver/display device that provides highly accurate travel distances and other information. The device includes a data processor that stores base stride length and rate data from traveling a pre-determined distance and compares that to actual stride rate data to calculate actual distance traveled, speed, and pace. The invention recognizes the interdependency of stride length and stride rate and uses that relationship to provide superior distance-calculating accuracy.

The invention also provides for improved display of relevant data on a wrist-mounted display that receives digital signals from devices worn on other body parts such as legs, waist, and chest. Transmitters that can send coded signals are desirable because they will not interfere with similar devices worn by other users in the vicinity.

The accuracy of the device can be enhanced using two different inventions. Both methods use an algorithm that adjusts a stride length based on actual stride rates. The two methods are known as the Shifting Curve method and the Unique Curve method. The Shifting Curve method uses a single algorithm that is modified to match an individual's running or walking characteristics. This algorithm is defined as: Actual Stride Length=Base Stride Length+Base Stride Length*(((Actual Stride Rate−Base Stride Rate) N)/Base Stride Rate); where N is either an average value or a derived value from a plurality of samples.

This method also includes a variation for calculating an actual stride length including steps of: timing a first user run of a predetermined distance; counting the total number of strides in the user first run; dividing the first run distance by the stride count to obtain a base stride length; dividing the stride count by the first run time to obtain a base stride rate; counting strides during a user's second run to obtain an actual stride rate; calculating the actual stride length using the formula: Actual Stride Length=Base Stride Length+Base Stride Length *(((Actual Stride Rate−Base Stride Rate )N)/Base Stride Rate); wherein N is an average value or a derived value.

The average value variation can be refined by comparing Base Stride Rate to Actual Stride Rate to determine a percentage difference; and using N=1 when the Actual Stride Rate≦Base Stride Rate*1.02 and using N=3 when Actual Stride Rate>Base Stride Rate*1.02. One embodiment uses a plurality of sample runs over known distances to derive an accurate N value for each individual.

The preferred method is referred to as the Unique Curve method that creates a unique or custom curve for each individual reflecting the unique relationship between stride rate and stride length at two or more sample points, and the rate of change between, above, and below these points to obtain an accurate stride length for incremental changes in stride rate.

The present invention can be used for walking only by: taking two walks of a known distance, but at significantly different paces—one relatively slow and one relatively fast. The steps counted by the pedometer over the known distance can be used to calculate a steps per second rate for both walks. These rates can then be used to generate a graph or table by interpolating and extrapolating the two rates to arrive at a stride length for any reasonable rate being walked by the user. This stride length can then be used to calculate a highly accurate distance being walked by a user of the pedometer of the present invention.

When used for running only, or running and walking, calculating stride length is similar to the above walking method, except more walks and runs are conducted over fixed distances at a variety of rates. A computer-stored card can be used during subsequent trips to find a very accurate stride length for a given step rate. The chart is unique for each user, and in this manner, a highly accurate step length can be calculated from a given step rate to calculate distance traveled, accurate speeds, optimum heart rates, optimum workout times at given heart rates, etc.

Other features and benefits of the present invention will be apparent from the following detailed description of the invention.

DETAILED DESCRIPTION OF THE DRAWINGS

Figure 1:
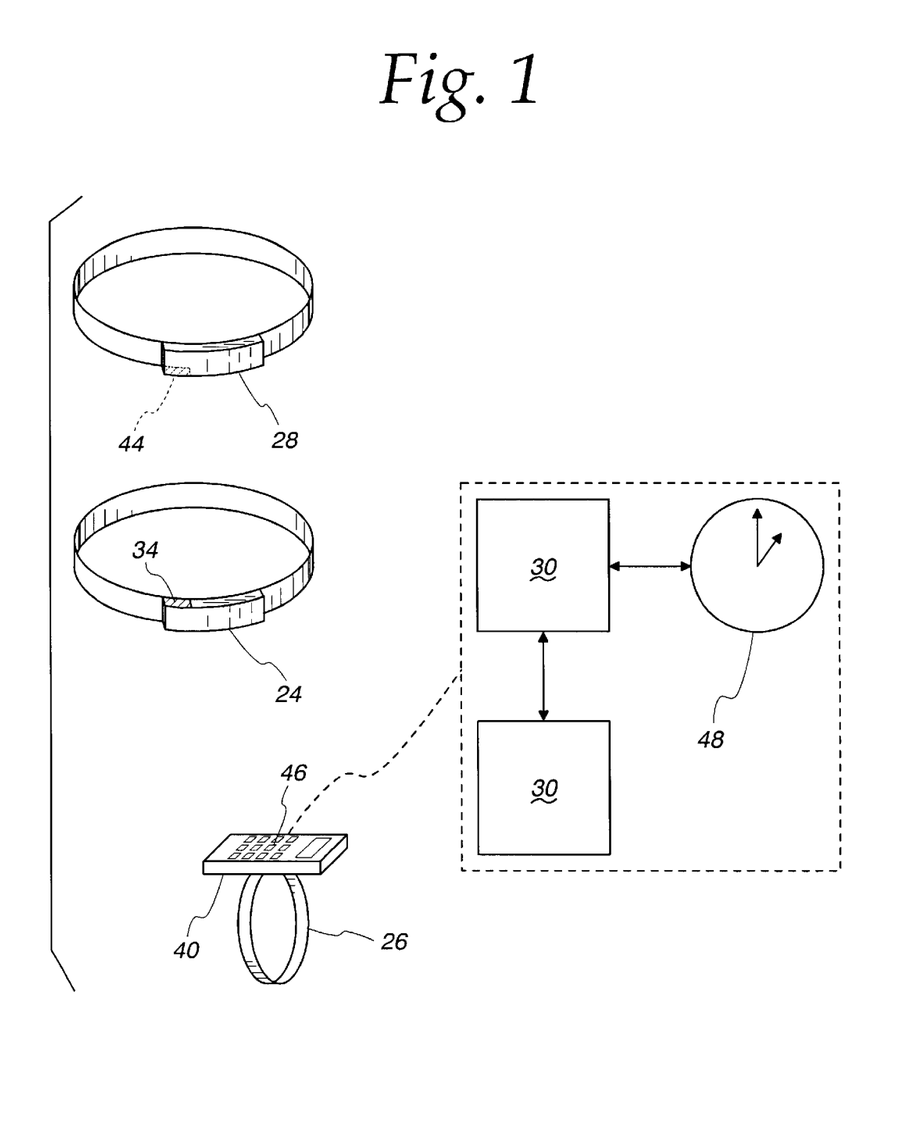
FIG. 1 is a schematic diagram of a pedometer in accordance with the present invention.

As illustrated in FIG. 1, the present invention is directed to an improved pedometer 20 including: a waist, chest, or leg mounted stride counter 24, and a wrist or waist mounted display unit 26. An optional chest-mounted heart monitor 28 can be included. All of the device components are mounted in suitable housings. The pedometer 20 includes a data processor 30 that is mounted in the same housing as either the step counter 24 or the display unit 26.

The step counter 24 is an inertia device or any suitable device, such as a piezoelectric device, that counts the number of steps a user takes. The number of steps is transmitted to a data archive 32 either directly or via a transmitter 34. The data archive 32 is mounted in the housing with the step counter 24 or the display 26.

The transmitter 34 is mounted in the step counter housing and is preferably an Rf telemetric signal transmitter with a 30 inches to 36 inches transmission range. Alternately, the transmitter is a wireless or wired digital transmitter with a coding function to limit or eliminate interference with other similar devices. The wireless transmission range is set between 30 inches and 36 inches to provide adequate range to transmit signals from a user's waist to wrist, but not so far as to cause interference with other Rf or digital devices in the vicinity.

The transmitter 34 transmits either raw data or calculated distances, pace, etc. to a wrist-mounted display unit receiver 40. The receiver 40 relays a raw data signal to the data processor 30 or a calculated data signal directly to the display panel 42, such as an LCD or LED.

Similarly, the heart rate monitor 28 includes a transmitter 44 that transmits heart rate data to the display unit 26. The heart monitor transmitter 44 can transmit at the same or a different frequency as the stride counter 24, and to the same or a different receiver in the display unit 26. The heart rate transmitter 44 is preferably Rf, but can be digital for the reasons stated above. The range of the heart rate transmitter 44 should also be between 30 inches and 36 inches to ensure effective communication with the receiver while limiting outside interference.

The data processor 30 can also include a programmable logic controller, a personal computer, a programmable read-only memory, or other suitable processor. The data processor 30 includes a data archive 32 to store historic data on stride length and pace to be used in an algorithm for calculating actual distances, speed, and rate for real-time conversion of data to useful information for a user.

The data processor 30 can also include closed loop or fuzzy logic programming to continually or periodically replace the base stride rate and length with recently calculated stride rates and lengths so that long term conditioning trends are accommodated in the base stride archive. Incorporating trend capabilities may further enhance accuracy of the distance and pace calculations.

The display unit 26 also includes an operator interface 46 such as a key pad, button, knob, etc. that enables the user to start and stop a clock 48 (or stop watch) and activate various use modes within the pedometer, such as a sampling mode and operation mode. Any of these components may be voice-activated.

The Shifting Curve method for using the pedometer 20, requires the user to operate a "sampling mode" and begin walking or running a pre-determined distance such as a mile or 1600 meters, preferably on a running track of a known size. Upon completion of the distance, a stop button on the operator interface 46 is pushed. The data processor 30 is programmed to then divide the distance by the number of strides counted to calculate an average stride length. This value is stored in the data archive 32 as the "Base Stride Length."

Also, the data processor 30 is programmed to divide the number of strides by the time of the run or walk as measured by the clock 48 to arrive at a "Base Stride Rate."

The data processor 30 preferably includes programming that queries the user about the distance to be run during the sampling mode. By providing options or enabling the use of any distance during the sampling mode, the pedometer 20 provides maximum flexibility for use by people of various physical conditions, or having access to courses of different known distances. Thus, a user may be queried to input a distance to be used in the sampling mode and then be given a list of options such as 400 meters, 440 yards, 1600 meters, or one mile, or be asked to simply input any distance known to the user that will be traveled during the sampling mode. Preferably, the pedometer 20 is sold with a 25 foot cord that can be used for calibration for walking modes. The cord simplifies the calibration process and ensures an accurate calibration.

The present invention makes full use of the relationship between a faster rate of travel and longer stride lengths. In other words, the faster a user is moving, the longer will be the stride length. Over the course of the run or walk, the user's step rate and, therefore, stride length will change and the user will cover more ground when moving fast and less ground when moving slow.

Clearly, using a fixed average stride length in calculating distance traveled will result in errors using prior pedometers. This is particularly true if a user changes pace, or improves conditioning and speed to the point where the average stride length over a given run increases dramatically. The error compensators in prior devices do not adjust for changes in pace. With the old devices, a user needed to re-calibrate periodically to be close to getting an accurate reading, and could not change pace during a workout without decreasing accuracy.

Some devices may offer separate settings for walking and running, but there is no method for automatically adjusting for incremental changes in stride rate which would introduce erroneous stride length data and over time or distance significantly accumulate errors to the point of being ineffective.

To make the correction, the user activates a "Use Mode" in which the data processor 30 calculates an Actual Stride Rate based on data from the stride counter 24 and the clock 48. For example, an Actual Stride Rate can be calculated every five seconds without the user doing more than activating the "Use Mode" button, while all the calculations are performed by the data processor automatically. The percentage change between the Actual Stride Rate and the Base Stride Rate is then computed by the data processor 30 to determine an Actual Stride Length. Again, if the Actual Stride Rate is greater than the Base Stride Rate, the Actual Stride Length is longer than the Base Stride Length. If the Actual Steps Per Second is lower than the Base Steps Per Second, the Actual Stride Length is shorter than the Base Stride Length. An algorithm can provide a means for comparing the Actual and Base Stride rates to arrive at an accurate Actual Stride Length.

First, a comparison between the Actual Stride Rate and the Base Stride Rate is made to determine whether Actual Stride Rate is less than or equal to Base Stride Rate multiplied by 1.02. Stride Length is calculated by:

Actual Stride Length=Base Stride Length+Base Stride Length*(((Actual Stride Rate−Base Stride Rate)N)/Base Stride Rate)

Where: N=1 when Actual Stride Rate is less than or equal to Base Stride Rate multiplied by 1.02, and N=3 when Actual Stride Rate is greater than Base Stride Rate multiplied by 1.02, although other N values in the range of one to three can be used.

The above algorithm is accurate for heel to toe activities such as walking or jogging, but is less accurate for sprinting (toe only).

A third variation of the Shifting Curve method of calculating actual stride length uses three separate run or walk samples at three different paces. This is the most accurate variation of the Shifting Curve method. With this variation, the N values are unique for each individual. By deriving an N value for each individual, this value more accurately reflects the actual change in stride length with a change in pace. After a proper warmup, the user completes a sample run or walk on the track at a normal pace. This first sample S1, will establish the Base Stride and the Base Steps Per Second.

S1 Sample

S1 Stride=Base Stride=Distance/Number of Steps

S1 Steps Per Second or S1 Steps Per Second=Base Steps Per Second=Number of Steps Per Second Following completion of the first run or walk at normal pace, the user runs or walks the same course and the same distance at a faster run or walking pace, but not a sprinting pace. The user should not run on his toes, but maintain the normal heel to toe jogging style. This is the S2 sample. The purpose of the S2 sample is to calculate an N2 value for each individual which reflects the effect an increase in Steps Per Second has on this individual's stride length. Some individual's steps will lengthen more than others as Steps Per Second increases, and by finding the value for N2, this relative increase can be quantified for a more accurate and customized algorithm for each individual.

S2 Sample

To find the N2 value, which will be used by the algorithm when Actual Steps Per Second>Base Steps Per Second $$N2=((S2\ Stride*S1\ Steps\ Per\ Second)-(S1\ Stride*S1\ Steps\ Per\ Second))/(S1\ Stride\ (S2\ Steps\ Per\ Second-S1\ Steps\ Per\ Second))$$

This value can be calculated since the distance is known, and both a Fast Stride Length (S2 Stride) and a Fast Steps Per Second (S2 Steps Per Second) can be calculated from the second sample.

Following completion of the fast run or walk, the user runs the same course and the same distance at a slower than normal run or walking pace. This pace cannot exceed the first sample pace. This is the S3 sample. The purpose of the S3 sample is to calculate an N3 value for each individual which reflects the effect a decrease in Steps Per Second has on this individual's stride length. Some individual's steps will shorten more than others as Steps Per Second decreases, and by finding the value for N3, this relative decrease can be quantified for a more accurate and customized algorithm for each individual.

S3 Sample

To find the N3 value, which will be used by the algorithm when Actual Steps Per Second<Base Steps Per Second.

$$N3=((S3\ Stride*S1\ Steps\ Per\ Second)-(S1\ Stride*S1\ Steps\ Per\ Second))/(S1\ Stride\ (S2\ Steps\ Per\ Second-S1\ Steps\ Per\ Second))$$

This value can be calculated since the distance is known and both a "Slow" Stride Length (S3 Stride) and a "Slow" Steps Per Second (S3 Steps Per Second) can be calculated from the third sample.

Once these three samples are completed and the information automatically calculated and stored in the data processor 30, then the following formula can be used for the most accurate measurements of speed and distance.

If: Actual Steps Per Second is less than or equal to Base Steps Per Second Then:

$$Stride\ Length=Base\ Stride+Base\ Stride*(((Actual\ Steps\ Per\ Second-Base\ Steps\ Per\ Second)N)/Base\ Steps\ Per\ Second)$$

And N=N3 (Stored Value)

If: Actual Steps Per Second>Base Steps Per Second Then:

$$Stride\ Length=Base\ Stride+Base\ Stride*(((Actual\ Steps\ Per\ Second-Base\ Steps\ Per\ Second)N)/Base\ Steps\ Per\ Second)$$

And N=N2 (Stored Value)

This third variation for calculating stride length, and subsequently distance, speed, and pace, is a far more accurate method than a fixed stride length pedometer. This device and method are also practical, convenient, and has a relatively low manufacturing cost. If an individual's running or walking style is progressing with training and practice (as seen by significantly improved times), then it may be beneficial for them to recalibrate their device by repeating the three samples every 3 to 6 months. If there are no significant improvements in time, then recalibration is not necessary.

It is noted that any single stride length or pace discussed above can in fact be an average of a plurality of stride lengths or rates from test runs to further refine accuracy in the calculations of actual stride data.

A fourth calibration lap could be added to the above formulations, but another method can be used to provide even more accurate calculations and results. As stated above, stride length depends upon the number of strides per second a walker or runner takes. But the degree with which stride length varies relative to strides per second, varies among different individuals.

The Unique Curve method can also be used with the present invention. When used for walking only includes the steps of: taking two walks of a known distance, but at significantly different paces—one relatively slow and one relatively fast. The steps counted by the pedometer over the known distance can be used with the time of each walk to calculate a steps per second rate for each walk. These rates can then be used to generate a graph or table by interpolating and extrapolating the two rates to arrive at a stride length for any reasonable rate being walked by the user. This stride length can then be used to calculate a highly accurate distance being walked by a user of the pedometer of the present invention.

When used for running only, the method for calculating stride length is similar to the above walking method, except the points should be obtained during runs and it is preferable to obtain three runs. When used for walking and running the method is the same except that the points should be obtained during both walks and runs with preferably two walks and three runs. Using this latter approach, a total of five walks and runs are conducted over a fixed distance at a variety of rates. The five steps per second rates that are obtained are used to generate a curve derived by interpolating and/or extrapolating between the five rates and step lengths. A computer generated and stored chart can be used during subsequent trips to find a very accurate stride length for a given step rate. The curve is unique for each user, and in this manner, a highly accurate step length can be calculated from a given step rate to calculate distance traveled, optimum heart rates, optimum workout times at given heart rates, etc.

Thus, using this Unique Curve method of calibration, a curve can be generated for a particular individual. A first alternate calibration option is preferred for individuals using the pedometer for walking only. It requires only two calibration walks. One is at normal speed, the other is at faster speed.

In a preferred embodiment it is desirable to show the calibration options and option number on the top line, and the description of the sampling pace on the bottom line of the display screen. Suitable LCD display screens can convey the necessary information to instruct the user on how to perform the calibration walks or runs.

After a Calibration Option is selected, and the track is selected, the user is ready to begin the two calibration walks required for this option. At this point, the LCD display will show 'WALK'.

The following steps are then followed.

1. After pressing MODE to select the correct calibration lap distance, the display would show that the user must now complete the first lap at their regular walking pace.
2. When the START button is pressed, the word 'WALK' will no longer be displayed, and the current calibration values will be displayed.
3. When STOP is pressed, the display will show the calibration results for five seconds. After five seconds, the results will go away, and the display will instruct the user to now complete the second lap at his or her fastest walking pace. This lap should be completed as fast as possible without breaking into running. 'FAST WALK' will appear on the display.
4. When the START button is pressed, the words 'FAST WALK' will go away, and the current calibration values will be displayed.
5. When STOP is pressed, the display will show the calibration results for five seconds. If there is an error condition, then an 'ERR' message with the error number will display. If there is no error, then the display will flash "OK" five times, and then automatically exit calibration mode and return to the stop watch mode. The pedometer is then ready for use.

If the pedometer is to be used for both walking and running, the following calibration steps can be followed.

After the Calibration Option is selected, and the track is selected, the user is ready to begin the five calibration walks/runs required for option (Run & Walk).

Instructions 1 to 4 are identical to the first 4 steps immediately above.

6. When STOP is pressed, the display will show the calibration results for five seconds. After five seconds, the display changes to instruct the user that a run must be completed at a slow running pace. This slow run pace is as slow as possible without walking. 'SLOW RUN' will appear on the display.
7. When the START button is pressed, the words 'SLOW RUN' will go away, and the current calibration values will be displayed.
8. When STOP is pressed, the display will show the calibration results for five seconds. After five seconds, the display will change to instruct the user that a run must be completed at a regular running pace. 'RUN' will appear on the display.
9. When the START button is pressed, the word 'RUN' will go away, and the current calibration values will be displayed.
10. When STOP is pressed, the display will show the calibration results for five seconds. After five seconds, the display will change to instruct the user that a run must be completed at a fast running pace. The runner should run a pace that does not require slowing down before completing this run. Failure to maintain a constant speed during calibration can cause errors. 'FAST RUN' will appear on the display.
11. When the START button is pressed, the words 'FAST RUN' will go away, and the current calibration values will be displayed.
12. When STOP is pressed, the display would show the calibration results for five seconds. If there is an error condition, the 'ERR' message with the error number would display. If there is no error, the display would flash "OK" five times, and then automatically exit calibration mode and return to the stop watch mode. The pedometer is now ready for use.

To assure that the calibration has been performed correctly, the data processor will perform the following error checks.

ERROR 1.
  If $T1<T2+20$ sec (400M) or +4 sec (100M) or +60 sec (1600M)
  If $T2<T3+20$ sec (400M) or +4 sec (100M) or +60 sec (1600M)
  If $T3<T4+10$ sec (400M) or +2 sec (100M) or 15 sec (1600M)
  If $T4<T5+10$ sec (400M) or +2 sec (100M) or 15 sec (1600M)

ERROR 2.
  If $T1>T2$, and $SPS1>SPS2$;
  If $T2>T3$, and $SPS2>SPS3$;
  If $T3>T4$, and $SPS3>SPS4$;
  If $T4>T5$, and $SPS4>SPS5$;

then there will be an Error 2 readout. Repeat calibration.

ERROR 3. Consistent Pace Not Maintained. If five second average SPS varies more than +/−0.20 from total average SPS during the calibration run, there will be an Error 3 readout and calibration should be repeated.

NO ERROR. If there is no error, the user is now ready to use the pedometer. The data processor will perform all the necessary calculations. The display will flash "OK" five times and convert to stop watch mode.

Once the above data is collected in the pedometer, it is converted to useful stride length data using the following steps.

1. The data processor will construct a "Look-Up Table" to find an adjusted stride length value for each 0.05 cm change in strides per second rate ("SPS").
2. SPS Table Range 1.50 to 3.00 (for walking only) or to 3.50 for running.
3. After the calibration laps are completed, the data processor will store in the Look-Up table the values for the first walk or run ("S1") and the second walk or run ("S2").
4. The data processor is programmed to then perform the following calculations.
   a. S2 Stride Length−S1 Stride Length=ΔStride Length
   b. S2 SPS (Steps Per Second)−S1 SPS=ΔSPS/0.05= Segment Divisor
   c. Δ Stride Length/Segment Divisor=Rate of Change Value (ROCV).
5. The Rate of Change Value will be subtracted from each corresponding Stride Length Value for every 0.05 decrease in SPS below the S1 (normal walk pace) SPS value.
6. The Rate of Change Value will be added to each corresponding Stride Length Value for every 0.05 increase in SPS above the S1 (normal walk pace) SPS value.

| SAMPLE 1 | | | | |
|---|---|---|---|---|
| | TIME | STEPS | SPS | STRIDE |
| S1 WALK | 272 | 545 | 2.00 | 73.30 |
| S2 FAST WALK | 210 | 479 | 2.28 | 83.50 |

| | SPS | STRIDE | RATE OF CHANGE VALUE |
|---|---|---|---|
| | 1.50 | 56.30 | |
| | 1.55 | 58.00 | |
| | 1.60 | 59.70 | |
| | 1.65 | 61.40 | |
| | 1.70 | 63.10 | |
| | 1.75 | 64.80 | |
| | 1.80 | 66.50 | |
| | 1.85 | 68.20 | |
| | 1.90 | 69.90 | |
| | 1.95 | 71.60 | |
| S1 | 2.00 | 73.30 | 1.70 |
| | 2.05 | 75.00 | |
| | 2.10 | 76.70 | |
| | 2.15 | 78.40 | |
| | 2.20 | 80.10 | |
| | 2.25 | 81.80 | |
| S2 | 2.30 | 83.50 | |
| | 2.35 | 85.20 | |
| | 2.40 | 86.90 | |
| | 2.45 | 88.60 | |
| | 2.50 | 90.30 | |
| | 2.55 | 92.00 | |
| | 2.60 | 93.70 | |
| | 2.65 | 95.40 | |
| | 2.70 | 97.10 | |
| | 2.75 | 98.80 | |
| | 2.80 | 100.50 | |
| | 2.85 | 102.20 | |
| | 2.90 | 103.90 | |
| | 2.95 | 105.60 | |
| | 3.00 | 107.30 | |

The bold value represent S1 and S2 calibration values.

More data points are desirable when the pedometer is used for running only or when used for both walking and running. The following examples uses five data points ranging from a normal walk to a fast run.

This option is selected by people who will use the pedometer for running only, and for running and walking. Each person should complete a course of the same distance five times. The order for these five sample calibration runs is:

1. Normal Walk
2. Fast Walk
3. Slow Run
4. Normal Run
5. Fast Run

By completing the same distance five times at these different paces, the data processor will interpolate between the points and extrapolate using the same rate of change for any points below (very slow) or above (very fast). The first part of the set up is the calibration requires the user to set either centimeters or inches, and the track length, preferably 400 meters. A sample at 100 meters tends to yield greater deviations between calculated stride length and actual stride length. Further, 1600 meters tends to be too long a distance for a consistent pace to be maintained.

The data processor will perform all the following necessary calculations.

A. After the Calibration laps are completed, the data processor will store in the Look-Up table the values for S1 through S5.

B. The Look-Up Table will have an SPS Range of 1.50 to 3.50.

C. Formula for constructing the Look-Up Table values is:
  i. S2 Stride Length−S1 Stride Length=ΔStride Length.
  ii. S2 SPS (Steps Per Second)−S1 SPS=ΔSPS/0.05= Segment Divisor.
  iii. ΔStride Length/Segment Divisor=Rate of Change Value (ROCV).

D. The data processor will construct a Look-Up Table to find an adjusted stride length value for each 0.05 cm change in SPS value.

E. This formula is repeated between each of the five sample points S1 to S5. There will be four different ROCV values.

F. The Rate of Change Value ROCV1 will be subtracted from each corresponding Stride Value for every 0.05 decrease in SPS below the S1 (normal walk pace) SPS value.

G. The Rate of Change Value ROCV1 will be added to each corresponding Stride Value for every 0.05 increase in SPS above the S1 (normal walk pace) SPS value and below the S2 value.

H. This pattern will be repeated for each of the next points through S5.

I. Above S5, the Rate of Change Value ROCV4 will be added to each corresponding Stride Value for every 0.05 increase in SPS above S5.

| Sample 2 | | | | |
|---|---|---|---|---|
| | TIME | STEPS | SPS | STRIDE |
| Walk | 237 | 468 | 1.95 | 85.4 |
| Fast Walk | 189 | 437 | 2.3 | 91.5 |
| Slow Jog | 125 | 350 | 2.8 | 114.2 |
| Norm Jog | 102 | 303 | 3 | 132 |
| Fast Jog | 81 | 257 | 3.15 | 155.6 |

| SPS | STRIDE | RATE CHANGE |
|---|---|---|
| 1.50 | 77.67 | |
| 1.55 | 78.54 | |
| 1.60 | 79.41 | |
| 1.65 | 80.28 | |
| 1.70 | 81.15 | |
| 1.75 | 82.02 | |
| 1.80 | 82.89 | |
| 1.85 | 83.76 | |
| 1.90 | 84.63 | |
| 1.95 | 85.50 | 0.87 |
| 2.00 | 86.37 | |
| 2.05 | 87.24 | |
| 2.10 | 88.11 | |
| 2.15 | 88.98 | |
| 2.20 | 89.85 | |
| 2.25 | 90.72 | |
| 2.30 | 91.50 | 2.25 |
| 2.35 | 93.75 | |
| 2.40 | 96.00 | |
| 2.45 | 98.25 | |
| 2.50 | 100.50 | |
| 2.55 | 102.75 | |
| 2.60 | 105.00 | |
| 2.65 | 107.25 | |
| 2.70 | 109.50 | |
| 2.75 | 111.75 | |
| 2.80 | 114.00 | 4.5 |
| 2.85 | 118.50 | |
| 2.90 | 123.00 | |
| 2.95 | 127.50 | |
| 3.00 | 132.00 | 7.87 |

Sample 2 (continued)

| | |
|---|---|
| 3.05 | 139.87 |
| 3.10 | 147.74 |
| 3.15 | 155.60 |
| 3.20 | 163.47 |
| 3.25 | 171.34 |
| 3.30 | 179.21 |
| 3.35 | 187.08 |
| 3.40 | 194.95 |
| 3.45 | 202.82 |
| 3.50 | 210.69 |

Sample 3

| | TIME | STEPS | SPS | STRIDE |
|---|---|---|---|---|
| Walk | 237 | 522 | 2.20 | 76.60 |
| Fast Walk | 179 | 452 | 2.55 | 88.40 |
| Slow Jog | 145 | 401 | 2.76 | 99.70 |
| Jog | 132 | 368 | 2.79 | 108.60 |
| Fast Jog | 106 | 310 | 2.92 | 129.00 |

| SPS | STRIDE | RATE/CHANGE |
|---|---|---|
| 1.80 | | |
| 1.85 | | |
| 1.90 | | |
| 1.95 | | |
| 2.00 | 69.84 | |
| 2.05 | 71.53 | |
| 2.10 | 73.22 | |
| 2.15 | 74.91 | |
| 2.20 | 76.60 | 1.69 |
| 2.25 | 78.29 | |
| 2.30 | 79.98 | |
| 2.35 | 81.67 | |
| 2.40 | 83.36 | |
| 2.45 | 85.05 | |
| 2.50 | 86.74 | |
| 2.55 | 88.40 | 2.82 |
| 2.60 | 91.22 | |
| 2.65 | 94.04 | |
| 2.70 | 96.86 | |
| 2.75 | 99.70 | 8.9 |
| 2.80 | 108.60 | 6.8 |
| 2.85 | 115.40 | |
| 2.90 | 122.20 | |
| 2.95 | 129.00 | |
| 3.00 | 135.80 | |
| 3.05 | 142.60 | |
| 3.10 | 149.40 | |
| 3.15 | 156.20 | |
| 3.20 | 163.00 | |

Sample 4

| | TIME | STEPS | SPS | STRIDE |
|---|---|---|---|---|
| Walk | | | | |
| Fast Walk | | | | |
| Slow Jog | 153.3 | 384 | 2.50 | 104.1 |
| Jog | 123.1 | 324 | 2.63 | 123.4 |
| Fast Jog | 96.2 | 266 | 2.77 | 150.3 |

| SPS | STRIDE | RATE/CHANGE |
|---|---|---|
| 1.95 | | |
| 2.00 | | |
| 2.05 | | |
| 2.10 | | |
| 2.15 | | |
| 2.20 | 65.52 | |
| 2.25 | 71.95 | |
| 2.30 | 78.83 | |
| 2.35 | 84.81 | |
| 2.40 | 91.24 | |
| 2.45 | 97.67 | |
| 2.50 | 104.10 | 6.43 |
| 2.55 | 110.53 | |
| 2.60 | 116.96 | |
| 2.65 | 123.40 | 13.45 |
| 2.70 | 136.85 | |
| 2.75 | 150.30 | |
| 2.80 | 163.75 | |
| 2.85 | 177.20 | |
| 2.90 | 190.65 | |
| 2.95 | | |
| 3.00 | | |
| 3.05 | | |
| 3.10 | | |
| 3.15 | | |
| 3.20 | | |

The bold values represent actual test calibration values.

Figure 2:
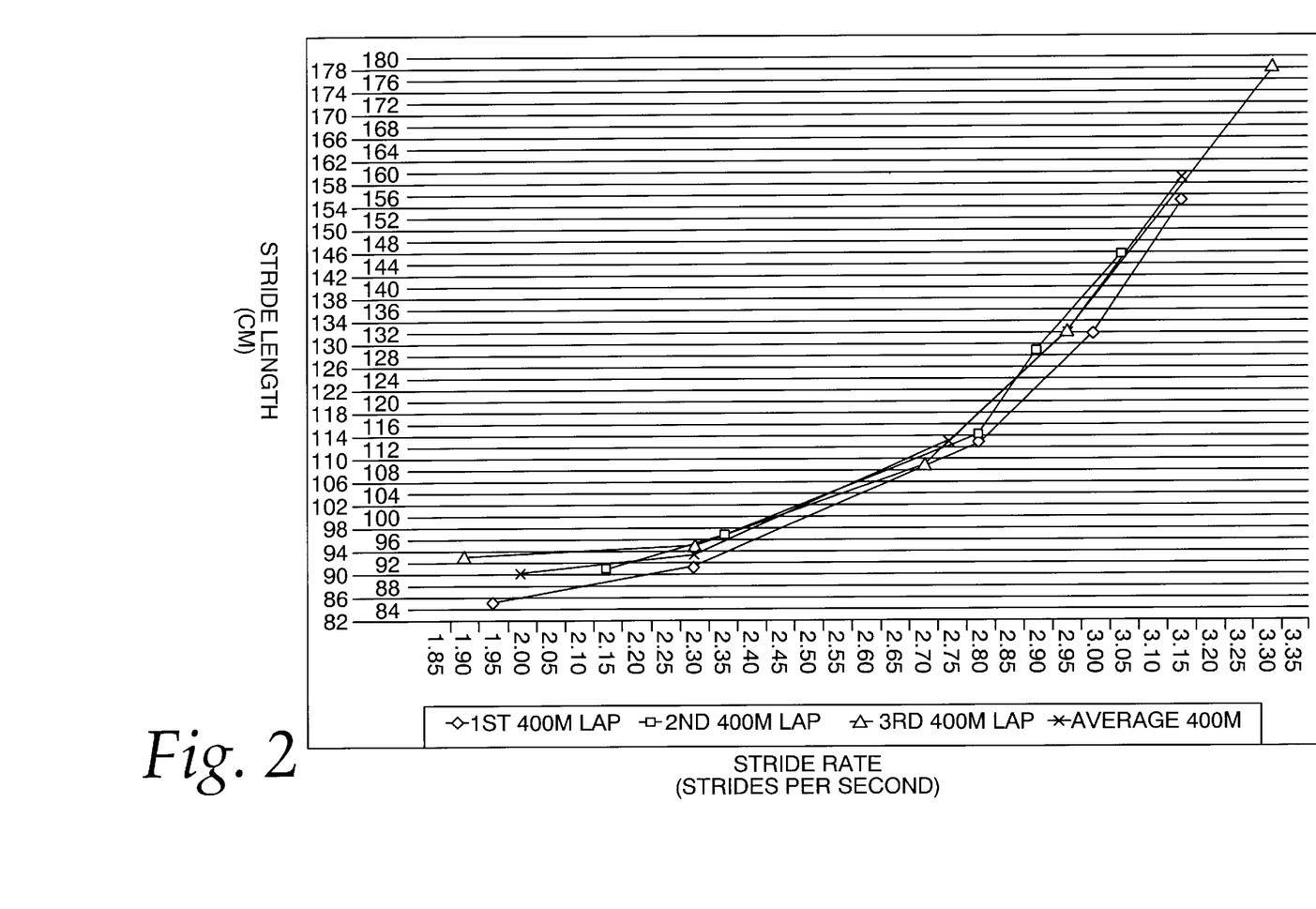
FIG. 2 is a graph illustrating stride length relative to stride rate.

In addition to taking single calibrations at each pace discussed above, a series of two or three calibrations can be taken at each pace and an average calibration figure can be used to create the Look-Up Table. Enhanced accuracy is possible using average calibrations. FIG. 2 is a chart illustrating an example of such a method and it illustrates that accuracies within two percent are possible.

The above-methods describe a table relationship between stride rate and stride length. An alternative method inserts stride length and rate into an algorithm as shown below.

Walking Calibration

Two Personal Calibration Samples Required

One at regular walking speed, two at the fastest walking speed.

Sample lengths can be at 25 Meters, 100 Meters, or 400 Meters

Sample 1 (S1) Normal Walking Speed: Stride Length=SL1, Stride Rate=SPS1, Time=T1.

Sample 2 (S2) Fastest Walking Speed: Stride Length=SL2, Stride Rate=SPS2, Time=T2.

SL=Solved for Stride Length

Calibration Errors:

ERROR 1:
If T1<T2+20 Seconds (400M); or +4 Seconds (100M); or +2 Seconds (25M)
PROBLEM: Times are too close together for accurate calibration.
SOLUTION: Repeat calibration laps while making sure there are larger time differences between each calibration sample.

ERROR 2:
If SPS1<SPS2+0.10
PROBLEM: Stride rates are too similar for accurate calibration.
SOLUTION: Repeat calibration laps while making sure there are larger time differences between each calibration sample.

ERROR 3:
If average SPS for any 20 second interval varies more than +/−0.20 from total average SPS during any calibration walk.
PROBLEM: Too much variation in stride rate for accurate calibration.
SOLUTION: Repeat calibration lap with a more consistent pace throughout the calibration samples.

Walking Algorithm $$SL = SL1 + ((SL2-SL1)/(SPS2-SPS1))*(\text{Actual } SPS-SPS1)$$

If Actual SPS<1.5, then Actual SPS=1.5.
If Actual SPS>3.0, then Actual SPS=3.0
Running Calibration
Four Personal Calibration Samples Required
One at regular walking speed, two at the fastest walking speed,
three at slowest running speed, and four at normal running speed.
Sample length should be 400 Meters.
Sample 1 (S1) Normal Walking Speed: Stride Length=SL1, Stride Rate=SPS1, Time=T1.
Sample 2 (S2) Fastest Walking Speed: Stride Length=SL2, Stride Rate=SPS2, Time=T2.
Sample 3 (S3) Slowest Jogging Speed: Stride Length=SL3, Stride Rate=SPS3, Time=T3.
Sample 4 (S4) Normal Running Speed: Stride Length=SL4, Stride Rate=SPS4, Time=T4.
SL=Solved for Stride Length
Calibration Errors:
ERROR 1:
  If T1<T2+20 Seconds (400M)
  If T2<T3+20 Seconds (400M)
  If T3<T4+10 Seconds (400M)
  PROBLEM: Times are too close together for accurate calibration.
  SOLUTION: Repeat calibration laps while making sure there are larger time differences between each calibration sample.
ERROR 2:
  If SPS1<SPS2+0.10
  If SPS2<SPS3+0.10
  If SPS3<SPS4+0.10
  PROBLEM: Stride rates are too similar for accurate calibration.
  SOLUTION: Repeat calibration laps while making sure there are larger time differences between each calibration sample.
ERROR 3:
  If average SPS for any 20 second interval varies more than +/−0.20 from total average SPS during any calibration walk or run.
  PROBLEM: Too much variation in stride rate for accurate calibration.
  SOLUTION: Repeat calibration lap with a more consistent pace throughout the calibration samples.
Running Algorithm
If Actual SPS<=SPS2, then $$SL = SL1 + ((SL2-SL1)/(SPS2-SPS1))*(\text{Actual } SPS-SPS1)$$

(Walking Speed Range)
If Actual SPS>SPS2, and <=SPS3, then $$SL = SL2 + ((SL3-SL2)/(SPS3-SPS2))*(\text{Actual } SPS-SPS2)$$

(Jogging Speed Range)
If Actual SPS>SPS3, then $$SL = SL3 + ((SL4-SL3)/(SPS4-SPS3))*(\text{Actual } SPS-SPS3)$$

(Running Speed Range)
If Actual SPS<1.5, then Actual SPS=1.5.
If Actual SPS>3.5, then Actual SPS=3.5.

UPDATE CALIBRATION WALK OR RUN

Another variation of the unique curve method is to start with four calibration samples over a known distance. After the four running samples are completed during the standard Personal Calibration Mode: Walk; Fast Walk; Slow Run; and Run A runner can check the accuracy of the constructed tables by performing an Update Calibration Run. By checking the accuracy on the track, the runner will have confidence that the feedback values are within 98% accurate. The following steps can be used to update a calibration (recalibration).

1. User enters Update Calibration Mode by holding Set for 10 seconds in Total Distance
   Mode. Screen Displays:
   UPDATE
   400 MTR
2. User completes 400 Meter Run or Walk in Update Mode. Update Calibration Lap(UC)
   The user can pick whatever speed he wants because only the section within +/−0.10 SPS of the UC Lap SPS will be updated, the rest of the table will remain unchanged. The manual will recommend that the Update Calibration lap be done at the user's normal or most common running speed.
3. The CPU compares the actual distance (400M) with the calculated distance (CD) derived from the lookup chart. If CD=400M +/−8M (2.0%), then no change is made to the look up table. And the display will flash OK for 5 seconds and return to the Chrono/Start Screen.
4. If CD>408M or CD<392M (2.0%), the table will be updated as follows:
   a. The CPU will calculate an Average SPS and an Average SL for the UC lap. (UC SPS and UC SL)
   b. It will find the Stride Length (SL) from the current look-up table corresponding to the SPS value of the UC SPS value.
   c. It will average these 2 stride length:
      (SL+UC SL)/2=Adjusted Stride Length (ASL)
   d. Divide ASL/SL to get ASL% change in table value.
   e. Adjust the table stride length values for the corresponding UC SPS value, and the UC SPS+0.05, and the UC SPS−0.05 value by:
      Updated Stride Length=SL×(1+ASL%)
      (i.e. Only 3 Different values will be adjusted by this percentage)
   f. Also, the SL for the SPS values UC SPS+0.10, and UC SPS −0.10 will be adjusted by:
      Updated Stride Length=SL (1+(ASL%/2))
5. A total of five SL values will have been adjusted. These five updated SL values then permanently replace the old values in the look-up table.
6. This Update Calibration mode can be repeated at different speeds to fine tune different parts of the curve until the error is less than 2%.
7. If the runner's conditioning is improving, or altered by injury, they can always update the calibration to assure greater than 98% accuracy. This would be quicker and easier than a fill set of four calibration samples.

Update Calibration Example

| ORIGINAL TABLE 4 Sample Look Up Table Values | | | | UPDATE CALIBRATION ADJUSTED TABLE | |
|---|---|---|---|---|---|
| SAMPLES | SPS | STRIDE | ROCV | ASL% | ADJUSTED STRIDE |
|  | 1.90 | 84.63 |  |  |  |
| S1 | 1.95 | 85.5 | 0.87 |  |  |
|  | 2.0 | 86.37 |  |  |  |
|  | 2.05 | 87.24 |  |  |  |
|  | 2.10 | 88.11 |  |  |  |
|  | 2.15 | 88.98 |  |  |  |
|  | 2.20 | 89.95 |  |  |  |
|  | 2.25 | 90.72 |  |  |  |
| S2 | 2.30 | 91.5 | 2.25 |  |  |
|  | 2.35 | 93.75 |  |  |  |
|  | 2.40 | 96.00 |  |  |  |
|  | 2.45 | 98.25 |  |  |  |
|  | 2.50 | 100.50 |  |  |  |
|  | 2.55 | 102.75 |  |  |  |
|  | 2.60 | 105.00 |  |  |  |
|  | 2.65 | 107.25 |  |  |  |
|  | 2.70 | 109.50 |  |  |  |
|  | 2.75 | 111.75 |  |  | (same) |
| S3 | 2.80 | 114.00 | 4.50 |  | 114.00 |
|  | 2.85 | 118.50 |  | +2.9%/2 = +1.72 | 120.22 |
|  | 2.90 | 123.00 |  | +2.9% = +3.57 | 126.57 |
| (UC SPS) | 2.95 | 127.50 |  | +2.9% = +3.69 | 131.19 |
| S4 | 3.00 | 132.00 |  | +2.9% = +3.83 | 135.83 |
|  | 3.05 | 136.50 |  | +2.9%/2 = +1.98 | 138.48 |
|  | 3.10 | 141.00 |  |  | 141.00 |
|  | 3.15 | 145.50 |  |  | (same) |
|  | 3.20 | 150.00 |  |  |  |

Update Calibration Run Sample Values
SAMPLE AVERAGES: UC SPS=2.95 and UC SL=134.9
Assume that the overall distance % error is greater than 2% because:
  UC SL=134.9 Corresponding SPS 2.95 SL=127.5
  134.9−127.5=7.4  7.4 1127.5=5.8% difference
Then:
  For UC SPS, UC SPS+0.05, and UC SPS−0.05;
  127.5+134.9=262.4/2=131.2 Average
  131.2−127.5=3.7/127.5=2.9%=ASL %
  =SL*(1+0.029)
  For UC SPS+0.10, and UC SPS −0.10;
  The adjusted value=ASL%/2=1.45 %
  =SL*(1+(0.029/2))

Alternative to the table method of updating calibration, the update calibration can also be performed using an algorithm as shown below.

Update Calibration—Running Algorithm
In Update Calibration mode, complete 400 Meter lap.
Compare calculated distance to 400M: 400M−Calculated Distance=M/400=E %
If E % is <+/−2% (+/−8 Meters), there is no update in formula.
If E % is >+/−2% (+/−8 meters),
Then first compare Update Lap SPS (ULSPS) to Stored SPS Values.
If ULSPS<=SPS2, then $$SL=(SL1+((SL2-SL1)/(SPS2-SPS1))*(\text{Actual } SPS-SPS1))*(1+E\%/2)$$

(Only Walking Speed Range is adjusted.)
If ULSPS>SPS2, and <=SPS3, then $$SL=(SL2+((SL3-SL2)/(SPS3-SPS2))*(\text{Actual } SPS-SPS2))*(1+E\%/2)$$

(Only Jogging Speed Range is adjusted.)
If ULSPS>SPS3, then $$SL=(SL3+((SL4-SL3)/(SPS4-SPS3))*(\text{Actual } SPS-SPS3))*(1+E\%/2)$$

(Only Running Speed Range is adjusted.)

Data Entry Set-up Option

All current pedometers require the user to determine what their step length is and then input this value into the memory of the pedometer. This process requires the user to mark out a certain distance on the floor or path, then walk over this distance while counting their steps. Then estimating what fraction of a step they have for the last step since most likely their last step will not end up exactly on the end line. Generally, most pedometer manufacturers ask the user to do this over a ten foot section. The problems with this method are:

1. It is inconvenient to have to find a long ruler or tape and mark out a course on the floor.
2. It requires the consumer to perform multiple mathematical operations, each time introducing the chance on an error.
3. When walking over such a short distance while concentrating on counting steps, it is difficult to maintain a natural gait—a small 8 cm measurement error on an average step length of 80 cm will yield a 10% error in distance.
4. Rounding out the last step can easily add a significant percentage of error over such a short sample length.
5. It prevents the user from immediately being able to use their pedometer.

These difficulties of set-up, combined with the fact that existing pedometers have only one, or at most two inputted stride lengths, when in reality stride lengths vary significantly with walking speed, have made the speed, distance, and calorie information provided by current pedometers very inaccurate.

Personal Calibration

While the Personal Calibration option we have invented and applied in the present invention provides the best and most accurate results, and is an easier procedure than described above and requires no math skills of the user, there is still a process that must be performed before the present invention can be used.

Data Entry Option

It is possible that there are individuals who would prefer the convenience of being able to use the pedometer of the present invention immediately without wanting to complete either the Personal Calibration procedure or measure and input their stride. For these individuals, they may not be concerned if the feedback results are a few percentage points off, and would rather have the convenience of simplified set-up.

For these individuals, an alternate embodiment of the present invention that allows it to be used immediately with results that are still superior to conventional pedometers. This Data Entry Option works as follows. Research on gait analysis can be used to construct three tables and/or algorithms showing specific stride lengths for specific steps per second values (SPS). In the Gender Tables (below) the first table or "Universal" table is an average of the population as a whole without regard to gender. The Universal table can be a default table or formula that is built into this embodiment of the present invention. If no further data is input by the user, then the pedometer will draw its stride length values from this table. Because the stride length values increase with every 0.05 increase in the SPS rate, the results will be more accurate than a device that has only one stride length value. The rate of change range for this formula is 1.5 cm to 2 cm per each 0.05 change in SPS over typical walking speeds of 1.50 SPS to 2.60 SPS.

The user will also be given the option of inputting two pieces of personal data that will further improve the accuracy of the device. These data show the correlations to step length are significant, and both pieces of data are already known by the consumer so no measuring or sampling procedure is required. It is known from previous studies, and testing confirms, that the rate of change of stride length to change in walking speed is slightly lower in women (Gender Table—Female), than in men (Gender Table—Men). And it is also known that women are on average, shorter in height than men and, thus, their stride lengths for a given SPS value are also shorter. Therefore, separate tables or algorithms for women and men can be constructed. By inputting the user's gender during set-up, the accuracy of the pedometer can be further improved.

Finally, user height can be used to adjust the stride length values will be adjusted up a certain percentage if the user is above average height, or down if the user is below average height (See Height Tables below.) With a percentage changes in stride length for every inch change in height from the average, each table is then fine-tuned to closer reflect averages of individuals of similar height and gender as the user. Attached is the chart showing the current gender specific tables and height adjustment percentages.

The stride length to stride rate used in this feature was derived from three different medical studies representing over 2300 people. Previously available data was correlated with additional research data by the inventor, confirming that the values are accurate for the majority of the population. In research, gender and height showed a stronger correlation to stride length than all other variables.

Also, by applying our data to these formulas, the unisex formula should have an average accuracy of greater than 92.5% over varied speeds, while the Gender/Height Formula should have an average accuracy of greater than 95%. Both of these accuracies are significantly better than current pedometer results when user walking speed is varied.

Further information such as age could be inputted, but we have shown that, there is little statistically significant correlation with this value to stride length. It is also possible to correlate leg length, but this would then require the user to measure their leg using specific measuring points which may be subjective. This would introduce another inconvenient step and potential error into the process while yielding little improvement in the accuracy of the results.

It is also possible to combine our Update Calibration option with the Data Entry method, thus providing the user a method of improving the calibration accuracy to 98% by walking over a known distance in the Update Calibration mode. The user does not need to perform the original two personal calibration walks, but instead begins with the Data Entry curves, and "fine tunes" these by repeating the Update Calibration until the desired accuracy is achieved.

Finally, these results are based on studies and testing of a Western population. It may also be desirably to produce tables based on more specific populations. For example, for pedometers sold in Japan, Universal Charts can be developed or the current charts adjusted to more closely reflect the biomechanics of this specific population.

GENDER TABLES

| | |
|---|---|
| UNIVERSAL FORMULA | rev.g.15.oo |
| DATE: | 15-Sep |
| CALIBRATION OPTION: | Review of Literature |
| CALIBRATION DISTANCE: | BASED ON REVIEW OF ALL AVAILABLE LARGE POPULATION STUDIES |
| SOFTWARE VERSION: | FEMALE VALUES BASED ON FIRST UNIVERSAL FORMULA |
| TRANSMITTER VERSION: | WHICH MORE CLOSELY MATCHED MY DATA |

| | STRIDE | SPS |
|---|---|---|
| UNISEX CALIBRATION VALUES | | |
| S1 | 72.5 | 1.85 |
| S2 | 81.5 | 2.05 |
| FEMALE CALIBRATION VALUES | | |
| S1 | 70.0 | 1.85 |
| S2 | 79.0 | 2.10 |
| MALE CALIBRATION VALUES | | |
| S1 | 75.0 | 1.80 |
| S2 | 84.0 | 2.00 |

| SPS | STRIDE | Rate/Change |
|---|---|---|
| ALGORITHM UNIVERSAL | | |
| SL = 72.5 − (1.85 − SPS) * 35 | | |
| CHART UNIVERSAL | | |
| 1.50 | 60.25 | |
| 1.55 | 62.00 | |
| 1.60 | 63.75 | |
| 1.65 | 65.50 | |
| 1.70 | 67.25 | |
| 1.75 | 69.00 | |
| 1.80 | 70.75 | |
| 1.85 | 72.50 | 1.75 |
| 1.90 | 74.25 | |
| 1.95 | 76.00 | |
| 2.00 | 77.75 | |
| 2.05 | 79.50 | |
| 2.10 | 81.25 | |
| 2.15 | 83.00 | |
| 2.20 | 84.75 | |
| 2.25 | 86.50 | |
| 2.30 | 88.25 | |
| 2.35 | 90.00 | |
| 2.40 | 91.75 | |
| 2.45 | 93.50 | |
| 2.50 | 95.25 | |
| 2.55 | 97.00 | |
| 2.60 | 98.75 | |
| 2.65 | 100.50 | |
| 2.70 | 102.25 | |
| 2.75 | 104.00 | |
| 2.80 | 105.75 | |
| 2.85 | 107.50 | |
| 2.90 | 109.25 | |
| 2.95 | 111.00 | |
| 3.00 | 112.75 | |
| ALGORITHM FEMALE | | |
| SL = 70 − (1.85 − SPS) * 34 | | |
| CHART FEMALE | | |
| 1.50 | 58.10 | |
| 1.55 | 59.80 | |
| 1.60 | 61.50 | |
| 1.65 | 63.20 | |
| 1.70 | 64.90 | |
| 1.75 | 66.60 | |
| 1.80 | 68.30 | |
| 1.85 | 70.00 | 1.7 |
| 1.90 | 71.70 | |
| 1.95 | 73.40 | |
| 2.00 | 75.10 | |
| 2.05 | 76.80 | |

GENDER TABLES-continued

| | |
|---|---|
| 2.10 | 78.50 |
| 2.15 | 80.20 |
| 2.20 | 81.90 |
| 2.25 | 83.60 |
| 2.30 | 85.30 |
| 2.35 | 87.00 |
| 2.40 | 88.70 |
| 2.45 | 90.40 |
| 2.50 | 92.10 |
| 2.55 | 93.80 |
| 2.60 | 95.50 |
| 2.65 | 97.20 |
| 2.70 | 98.90 |
| 2.75 | 100.60 |
| 2.80 | 102.30 |
| 2.85 | 104.00 |
| 2.90 | 105.70 |
| 2.95 | 107.40 |
| 3.00 | 109.10 |

ALGORITHM MALE
SL = 75 − (1.85 − SPS) * 36
CHART MALE

| | | |
|---|---|---|
| 1.50 | 64.20 | |
| 1.55 | 66.00 | |
| 1.60 | 67.80 | |
| 1.65 | 69.60 | |
| 1.70 | 71.40 | |
| 1.75 | 73.20 | |
| 1.80 | 75.00 | 1.8 |
| 1.85 | 76.80 | |
| 1.90 | 78.60 | |
| 1.95 | 80.40 | |
| 2.00 | 82.20 | |
| 2.05 | 84.00 | |
| 2.10 | 85.80 | |
| 2.15 | 87.60 | |
| 2.20 | 89.40 | |
| 2.25 | 91.20 | |
| 2.30 | 93.00 | |
| 2.35 | 94.80 | |
| 2.40 | 96.60 | |
| 2.45 | 98.40 | |
| 2.50 | 100.20 | |
| 2.55 | 102.00 | |
| 2.60 | 103.80 | |
| 2.65 | 105.60 | |
| 2.70 | 107.40 | |
| 2.75 | 109.20 | |
| 2.80 | 111.00 | |
| 2.85 | 112.80 | |
| 2.90 | 114.60 | |
| 2.95 | 116.40 | |
| 3.00 | 118.20 | |

HEIGHT TABLES

| HEIGHT ADJUSTMENT PERCENTAGE CHART | | | HEIGHT ADJUSTMENT PERCENTAGE CHARTS | | |
|---|---|---|---|---|---|
| FEMALES HEIGHT Feet/Inch | Inches | % Change | MALES HEIGHT Feet/Inch | Inches | % Change |
| 4'6" | 54 | −7.0% | 4'10" | 58 | −7.0% |
| 4'7" | 55 | −6.0% | 4'11" | 59 | −6.0% |
| 4'8" | 56 | −5.0% | 5'0" | 60 | −5.0% |
| 4'9" | 57 | −4.0% | 5'1" | 61 | −4.0% |
| 4"10" | 58 | −3.0% | 5'2" | 62 | −3.0% |
| 4"11" | 59 | −2.0% | 5'3" | 63 | −2.0% |
| 5'0" | 60 | −1.5% | 5'4" | 64 | −1.5% |
| 5'1" | 61 | −1.0% | 5'5" | 65 | −1.0% |
| 5'2" | 62 | −0.5% | 5'6" | 66 | −0.5% |
| 5'3" | 63 | 0.0% | 5'7" | 67 | 0.0% |
| 5'4" | 64 | 0.0% | 5'8" | 68 | 0.0% |
| 5'5" | 65 | 0.0% | 5'9" | 69 | 0.0% |
| 5'6" | 66 | 0.5% | 5'10" | 70 | 0.5% |
| 5'7" | 67 | 1.0% | 5'11" | 71 | 1.0% |
| 5'8" | 68 | 1.5% | 6'0" | 72 | 1.5% |
| 5'9" | 69 | 2.0% | 6'1" | 73 | 2.0% |
| 5'10" | 70 | 3.0% | 6'2" | 74 | 3.0% |
| 5'11" | 71 | 4.0% | 6'3" | 75 | 4.0% |
| 6'0" | 72 | 5.0% | 6'4" | 76 | 5.0% |
| 6'1" | 73 | 6.0% | 6'5" | 77 | 6.0% |
| 6'2" | 74 | 7.0% | 6'6" | 78 | 7.0% |

Single Sample Walking Calibration Option

Another variation of calibration that is a hybrid between personal calibration with multiple samples, and the data entry, is to use a single sample calibration. This option would be better suited for walking only pedometers. This option uses the empirical averages of the rate of change for the population as a whole, or it can also use the empirical averages by gender. It then applies this rate of change to a single stride length/SPS personal calibration sample done at the walkers normal walking speed. Using this method, the user will enter calibration mode, and first enter gender—male or female, and then select one of several walking distances 25 meter, 100 yards, 400 meters, etc. The user then walks this distance at a constant speed at their normal walking pace. The VeloMeter then records the average Stride Length (SLS), and average SPS (SPSS), and plugs these values into the following algorithm(s) to calculate distance on subsequent walks (Actual SPS):

Unisex SL=SLS−(SPSS−Actual SPS)*35

(If there was no gender option used)

Female SL=SLS−(SPSS−Actual SPS)*34

Male SL=SLS−(SPSS−Actual SPS)*36

(The multiple on the far right of the equation reflects the average rate of change of stride length for the population over 0.05 SPS intervals.)

This method improves accuracy over the data entry only method by assuring that the starting point for the stride length reflects the individuals actual stride length at a specific SPS value based on a sample. When the user varies their speed, the stride length will vary based on the rate of population averages. This method reduces the number of samples needed to one. Though it may not be as accurate as the two sampling method for people whose rate of change varies from the norms, the simplicity of explaining and performing a single sample at one speed, may outweigh the benefits of improved accuracy for some people. Since many people will do their walks near their normal speeds, and the closer they are to the sample SPS speed, the lower the error, the overall error rate should remain low.

As with other methods, this method could be combined with the update calibration option to improve the accuracy.

With this approach, it can be expected that there will be more deviations and larger errors exceptions for the non-sampling methods. The average accuracy is still high for the non-sampling methods because it reflects the averages of the whole population, but some individuals with unusual walking biomechanics may not get acceptable results. There will be a higher consistency of low error rates with the personal calibration sampling methods. The longer the sample distance up to 400 meters, the higher the average accuracy.

Repeated Update Calibration sampling could improve all methods to 98% accuracy.

Other variations on this device could also incorporate an altimeter which measures changes in elevation. The stride length could then be adjusted (shortened) when elevation is increasing, and lengthened when elevation is decreasing. This adjustment could be done with an average value or with a derived value by running or walking over a known distance on a hilly course. This device preferably includes two batteries so that the calibration data is not lost when the batteries are replaced one at a time.

Once the actual stride length is calculated for a given period of time, the value can be multiplied by the number of strides in that period to obtain a total distance for that period to be stored in a data archive file for that particular walk or run and added to other actual stride lengths or distances for other periods in which stride length was calculated. When the run or walk is completed, the user engages the operator interface 46 to indicate that a total distance is to be displayed on the display unit. There can also be a continual display of the distance traveled.

As a result of accurately calculating distance traveled, the pedometer 20 also has the capability of calculating speed in miles per hour, for example or pace in minutes per mile, including average speed and pace over the course of that particular walk or run. Further, the pedometer 20 can include a port for coupling to a separate personal computer or computing device to create larger training histories, trends, etc.

Additional features can include stop watches, day, date and time displays, as well as, heart rate displays as discussed above. Also, it will be understood that all distances and time periods used above can be varied in length and units of measure (English, metric, seconds, minutes, hours, etc.).

Using such sophisticated and accurate methods for calculating pace and distance traveled, a user can determine optimum work out lengths and paces. The data processor can either calculate optimum work out conditions or the user or trainer/coach can input the optimum conditions. Once these conditions are known, the pedometer can signal the user during a workout as to whether optimum conditions are being met. A sound signal or message on the screen can be used to convey this information.

Also, the data can be sent to a computer or directly to an Internet site via a wireless or cable system at the completion of a workout. Once the data is collected it can be used to provide a variety of comparisons and development charts to aid in training of individuals users.

The foregoing detailed description is provided for clearness of understanding only and no unnecessary limitations therefrom should be read into the following claims.

What is claimed is:

1. A pedometer comprising:
   a data processor programmed to create an initial calibration table of initial stride rates and lengths to be compared to an actual stride rate for deriving a corresponding actual stride length;
   obtain a recalibration stride rate over a known distance traveled;
   determine a calculated distance traveled using the initial calibration table and the recalibration stride rate;
   compare the calculated distance traveled with the known distance traveled to determine the difference, if any, between the two; and
   replace an initial stride length with a revised stride length that is a function of the initial stride length and the recalibration stride length.

2. The pedometer of claim 1, and further comprising:
   a strap connected to the pedometer for releasably securing the pedometer to a user; and
   a heart rate monitor connected to the strap.

3. The pedometer of claim 1, wherein the data processor is further programmed to calculate each initial stride length as an average of the stride lengths calculated during each calibration run.

4. The pedometer of claim 1, wherein the data processor is further programmed to calculate each stride rate as a function of the average stride rate calculated during each calibration run.

5. The pedometer of claim 1, wherein the data processor is further programmed to calculate an initial stride rate as a function of the average stride rate from a plurality of calibration runs, and to recalibrate a stride rate as a function of the difference between the initial stride rate and the subsequent stride rate.

6. The pedometer of claim 1, wherein the data processor is further programmed to recalibrate the range of initial stride rates as a function of a subsequent known stride rate in an algorithm.

7. The pedometer of claim 1, wherein the data processor is programmed to create the initial calibration table from one or more of the following user characteristics:
   a) height; or
   b) gender.

8. A pedometer data processor programmed to:
   create an initial recalibration table of initial stride rates and lengths for comparison with an actual stride rate for deriving a corresponding actual stride length and distance traveled;
   calculate a recalibration stride length corresponding to a known stride rate over a known distance traveled;
   determine a calculated distance traveled using the initial calibration table and the known stride rate;
   compare the calculated distance traveled with the known distance traveled to determine a difference between the two; and
   adjust the initial calibration table with a revised stride length that is a function of the initial stride length and the known stride length.

9. The pedometer of claim 8, wherein the data processor is further programmed to replace an initial stride length will be replaced with a recalibrated stride length only when the difference between the calculated distance traveled and the actual distance traveled is greater than two (2) percent.

10. The pedometer data processor of claim 8, wherein the data processor is further programmed to:
    calculate each initial stride rate as an average of all stride rates measured during a corresponding calibration run.

11. The pedometer data processor of claim 8, wherein the data processor is further programmed to:
    calculate each initial stride length as an average of all stride lengths calculated during a corresponding calibration run.

12. The pedometer data processor of claim 8, wherein the data processor is further programmed to:
    calculate the recalibration stride rate as an average of all stride rates calculated during recalibration.

13. The pedometer data processor of claim 8, wherein the data processor is further programmed to:

calculate the actual stride length as an average of all stride lengths calculated during recalibration.

14. The pedometer data processor of claim 8, wherein the data processor is further programmed to:

compare the known stride rate with an initial stride rate of equal value and replacing the corresponding initial stride length with a recalibration stride length when the corresponding initial stride length varies by more than a predetermined amount from the actual stride length.

15. The pedometer data processor of claim 8, wherein the data processor is further programmed to:

create the initial calibration table to comprise sequentially increasing first, second, and third initial stride rates and corresponding sequentially increasing first, second, and third initial stride lengths, wherein the actual stride rate is equal to the second stride rate, the first stride rate is 0.05 steps per second less than the second stride rate and the third stride rate is 0.5 steps per second greater than the second stride rate;

replace the second stride length with the actual stride length;

calculate the stride length recalibration percentage based on the percentage difference between the actual stride length and the second stride length;

replace the first stride length with a stride length that is equal to the first stride length increased by the stride length recalibration percentage; and replace the third stride length with the stride length that is equal to the third stride length increased by the stride length recalibration percentage.

16. The pedometer data processor of claim 8, wherein the initial calibration table is created from one or more of the following user characteristics:

a) height; or b) gender.

17. A pedometer comprising:

a step counter;

a transmitter in communication with the step counter to generate a step count signal corresponding to each step and transmit the step count signal;

a receiver mountable on a user body portion to receive the step count signal transmitted from the transmitter and calculate a distance from a number of steps counted by the step counter; and a data processor programmed to calculate a distance traveled by multiplying a number of steps counted by a stride length that varies according to a rate at which steps are taken, and further programmed to derive an actual stride length from a range of stride lengths calculated from a range of corresponding stride rates, the range of stride rates and stride lengths being derived from predetermined empirical data.

18. The pedometer of claim 17, wherein the empirical data is derived from one or more of the following characteristics:

a) height; or b) gender.

19. The pedometer of claim 17, wherein the empirical data shows a stride length rate of change of between 1.5 and 2.0 centimeters for each 0.05 change in steps per second.

* * * * *